United States Patent [19]

Degen et al.

[11] Patent Number: 4,835,212
[45] Date of Patent: May 30, 1989

[54] SIZING AGENTS FOR PAPER BASED ON FINELY DIVIDED AQUEOUS DISPERSIONS

[75] Inventors: Hans-Juergen Degen, Lorsch; Fritz Reichel, Hirschberg; Ulrich Riebeling, Schifferstadt; Lothar Hoehr, Worms, all of Fed. Rep. of Germany

[73] Assignee: BASF Aktiengesellschaft, Ludwigshafen, Fed. Rep. of Germany

[21] Appl. No.: 146,193

[22] Filed: Jan. 20, 1988

[30] Foreign Application Priority Data

Jan. 30, 1987 [DE] Fed. Rep. of Germany ....... 3702712

[51] Int. Cl.$^4$ ............................................. D21H 3/46
[52] U.S. Cl. ................................... 524/734; 524/827; 524/831; 524/832; 524/47
[58] Field of Search .................. 524/47, 48, 732, 734, 524/820, 827, 831, 832

[56] References Cited

U.S. PATENT DOCUMENTS

| | | | |
|---|---|---|---|
| 3,061,471 | 10/1962 | Brockway et al. | 527/311 |
| 3,061,472 | 10/1962 | Brockway | 527/311 |
| 4,301,017 | 11/1981 | Kightlinger et al. | 252/8.6 |
| 4,560,724 | 12/1985 | Brabetz et al. | 524/734 |
| 4,670,505 | 6/1987 | Craig | 524/704 |

FOREIGN PATENT DOCUMENTS

| | | |
|---|---|---|
| 134449 | 3/1985 | European Pat. Off. |
| 150003 | 7/1985 | European Pat. Off. |
| 2234908 | 10/1973 | Fed. Rep. of Germany |
| 58-115196 | 7/1983 | Japan |

*Primary Examiner*—John Kight
*Assistant Examiner*—Nathan M. Nutter
*Attorney, Agent, or Firm*—Oblon, Fisher, Spivak, McClelland & Maier

[57] ABSTRACT

Sizing agents for paper are based on finely divided aqueous dispersions of copolymers obtainable by copolymerizing from 40 to 140 parts by weight of a monomer mixture of (a) from 20 to 65% by weight of (meth)acrylonitrile,
(b) from 35 to 80% by weight of one or more acrylates of monohydric saturated $C_3$–$C_8$-alcohols and
(c) from 0 to 10% by weight of other ethylenically unsaturated copolymerizable monomers, the weight percentages (a), (b) and (c) always adding up to 100, in the manner of an emulsion polymerization in 100 parts by weight of an aqueous solution containing in solution from 2.7 to 15% by weight of a degraded starch having a viscosity $n_i$ from 0.04 to less than 0.12 dl/g at from 40° to 100° C. in the presence of a peroxide initiator.

7 Claims, No Drawings

SIZING AGENTS FOR PAPER BASED ON FINELY DIVIDED AQUEOUS DISPERSIONS

U.S. Pat. No. 3,061,471 discloses polymerizing acrylates derived from alcohols of 2 to 4 carbon atoms in the presence of free radical polymerization initiators in an aqueous solutin of search. Stable aqueous dispersions are obtained, which are used as sizing agents for textiles. According to U.S. Pat. No. 3,016,472, the polymerization of acrylates derived from alcohols of 2 to 4 carbon atoms in aqueous solutions of starch is carried out additionally in the presence of a nonionic surfactant. Again the aqueous dispersions thus obtained are used as sizing agents for textiles.

U.S. Pat. No. 4,301,017 discloses a stable aqueous polymer dispersion obtained by copolymerizing one or more vinyl monomers in an aqueous solutions of a derivatized and dilute search. The starch used has a degree of substitution of not less than 0.05 and an intrinsic viscosity of not less than 0.12 dl/g. The plymer disperions thus obtained are used as textile sizing and coating agents. In the process disclosed in EP Application No. 134,449, aqueous polymer dispersions are polylmerized by polymerization of ethylenically unsaturated compounds in an aqueous medium in the presence of not less than 0.6% by weight, based on the total weight of the monomers, of a water-soluble or degraded starch using not less than 30 mmol, per kg of monomers, of hydrogen peroxide, ketone peroxides and/or organic hydroperoxides and also redox catalysts at from 10° to 100° C. The polymer dispersions thus obtainable are used for producing adhesives, as dyeing, textile or paper assistants, or in hydraulically setting compositions. However, the dispersions have only a poor sizing action for paper.

JP Preliminary Published Application No. 58/115,196 discloses a paper assistant which increases the strength of paper and at the same time sizes the paper. The paper assistant is based on a dispersion of a graft copolymer of styrene with alkyl acrylates on starch. The graft copolymers are obtained by polymerizing starch and an acrylate, for example n-butyl acrylate, in an aqueous medium in which the starch is present in solution at from 20° to 100° C. to form an aqueous dispersion. The sizing effects obtainable by means of these dispersions on paper are still in need of improvement.

Earlier, non-prior-published DE Patent Application No. P 35 27 594.8 corresponding to U. S. Application Serial No. 07/074,031, filed July 16, 1987, describes sizing agents for paper based on finely divided aqueous dispersions of copolymers obtainable by copolymerizig from 10 to 56 parts by weight of a monomer mixture of (a) from 20 to 65% by weight of acrylonitrile and/or methacrylonitrile, (b) from 80 to 35% by weight of an acrylate of a monohydric saturated $C_3$–$C_8$-alcohol and (c) from 0 to 10% by weight of other ethylenically unsaturated copolymerizable monomers, the weight percentages (a), (b) and (c) always adding up to 100, in the manner of an emulsion polymerization in 100 parts by weight of an aqueous solution containing in solution from 1.5 to 25% by weight of a degraded starch having a viscosity $\eta_i = 0.12$–$0.50$ dl/g, at from 40° to 100° C. in the presence of a peroxide initiator.

It is an object of the present invention to provide an improved sizing agent for paper based on a finely divided aqueous dispersion of a copolymer obtainable by copolymerizing an ethylenically unsaturated monomer in the manner of an emulsion polymerization in the presence of starch.

We have found that this object is achieved by copolymerizing from 40 to 140 parts by weight of a monomer mixture of (a) from 20 to 65% by weight of acrylonitrile and/or methacrylonitrile, (b) from 80 to 35% by weight of an acrylate of a monohydric saturated $C_3$–$C_8$-alcohol and (c) from 0 to 10% by weight of other ethylenically unsaturated copolymerizable monomers, the weight percentages (a), (b) and (c) always adding up to 100, in 100 parts by weight of an aqueous solution containing in solution from 2.7 to 15% by weight of a degraded starch having a viscosity $\eta_i = 0.04$ to less than 0.12 dl/g at from 40° to 100° C. in the presence of a peroxide initiator.

To prepare the sizing agent dispersion, the monomer of group (a) used is acrylonitrile or methacrylonitrile or a mixture thereof. Based on the total amount of monomer used in the polymerization, the monomers of group (a) are present in an amount from 20 to 65, preferably from 25 to 62, % by weight.

The monomer of group (b) is an acrylate derived from a monohydric saturated $C_3$–$C_8$-alcohol. Suitable acrylates of this kind are of example n-proply acrylate, isopropyl acrylate, n-butyl acrylate, isobutyl acrylate, tert.-butyl acrylate, neopentyl acrylate, n-hexyl acrylate, cyclohexyl acrylate and 2-ethylhexyl acrylate. The monomer of group (b) is preferably a butyl acrylate, specifically n-butyl acrylate or isobutyl acrylate, or a mixture thereof, or a mixture of n-butyl acrylate and tert.-butyl acrylate or a mixture of isobutyl acrylate and tert.butyl acrylate, in any desired ratio. The monomer of group (b) is used in amount from 35 to 80, preferably from 38 to 75, % by weight, based on the total amount of monomer used in the copolymerization. The copolymerization can also be carried out in the presence of monomers of group (c) which are used facultatively for modifying the copolymer of (a) and (b). The monomers of group (c) comprise from 0 to 10% by weight of other ethylenically unsaturated copolymerizable monomers which do not fall within the definition of monomers as per (a) and (b). The sum of weight percentages of (a), (b) and (c) is always 100. The monomer of group (c) can be for example an ethylenically unsaturated $C_3$–$C_5$-carboxylic acid, such as acrylic acid, methacrylic acid, maleic acid, fumaric acid, itaconic acid or a maleic monoester. This group of monomers also includes vinyl sulfonate and 2-acrylamidopropanesulfonic acid and the alkali metal salts thereof. The ethylenically unsaturated carboxylic acids can have been neutralized completely or only partially, for example up to 10–80%, with sodium hydroxide solution, potassium hydroxide solution, ammonia and/or amines.

A further way of modifying the copolymers of monomers (a) and (b) comprises copolymerizing in as monomers (c) basic compounds, for example di-$C_1$–$C_3$-alkylamino-$C_2$–$C_6$-alkyl acrylates and the corresponding methacrylates, N-vinylimidazoline and/or N-vinyl-2-methylimidazoline. Of the basic acrylates, preference is given to using dimethylaminoethyl methacrylate, dimethylaminoethyl acrylate and diethylaminoethyl acrylate. The basic acrylates are used in the copolymerization in the form of the salts with inorganic acids, such as hydrochloric acid or sulfuric acid, or with organic acids, for example formic acid, acetic acid or propionic acid, and also in quaternized form. Suitable quaternizing agents are in particular methyl chloride, dimethyl sulfate, diethyl sulfate, ethyl chloride and benzyl chloride. The effect of modifying the copolymers of components (a) and (b) with basic acrylates or N-vinylimidazolines is that the finely divided copolymer disperions of monomers (a) and (b) thus modified have better affinity for the fiber than unmodified copolymer dispersions.

A further way of obtaining modification comprises copolymerizing the monomers (a) and (b) in the presence of nonionic monomers; for the purposes of this invention, this group of monomers (c) includes styrene, acrylamide, methacrylamide, methacrylates derived from $C_1$–$C_{18}$-alcohols and/or acrylates different from acrylates (b), eg. methyl acrylate, ethyl acrylate, decyl acrylate, palmityl acrylate and/or stearyl acrylate. Of the nonionic monomers of group (c), in particular sytrene, acrylamide and methacrylamide are of particular importance. The monomers of group (c), like the monomers fo the other groups, can be copolymerized alone or in mixture with the monomers (a) and (b).

Particularly effective sizing agents are obtained by copolymerizing a monomer mixture of acrylonitrile and one or more butyl acrylates, preferably from 25 to 62% by weight of acrylonitrile and from 75 to 38% by weight of n-butyl acrylate or of a mixture of butyl acrylates, in an aqueous solution of a degraded starch having a viscosity $\eta_i$ from 0.04 to less than 0.12 dl/g in the presence of a peroxide initiator.

The copolymerization of monomers (a) to (c) is performed in the manner of an emulsion polymerization in an aqueous medium in the presence of degraded starches having a viscosity $\eta_i$ from 0.04 to less than 0.12 dl/g, preferably from 0.045 to 0.11 dl/g. Starches having this viscosity have already been subjected to an oxidative, thermal, acidolytic or enzymatic degradation. For this degradation it is possible to use natural starches, such as potato starch, wheat starch, rice starch, tapioca starch or cornstarch. It is also possible to degrade chemically modified starches, such as those containing hydroxyethyl, hydroxypropyl or quaternized aminoalkyl groups, to a viscosity $\eta_1$ of from 0.04 to less than 0.12 dl/g. Preference is given to using oxidiatively degraded potato starch, cationized degraded potato starch or hydroxyethyl starch, in particular such a starch having a viscosity $\eta_i$ from 0.045 to 0.1 dl/g.

The viscosity $\eta_i$, also known as intrinsic viscosity, of starch is calculated from the relative viscosity $\eta_{rel}$ by the following equation:

$$\eta_i = (2.303 \times \log \eta_{rel})/\text{concentration}$$

where the concentration is given in g/100 ml. The relative viscosity of the digested starch solution is determined by means of a capillary viscometer from the viscosity of the solution at 25° C., the relative viscosity being determined from the corrected flow times $t_0$ (for the solvent) and $t_1$ (for the solution) by the following equation:

$$\eta_{rel} = t_1/t_0.$$

$\eta_{rel}$ is converted to $\eta_i$ by the above equation on the basis of Methods in Carbohydrate Chemistry, volume IV, Starch, Academic Press, New York and London, 1964, page 127.

To prepare the finely divided copolymer dispersion, first an aqueous solution is prepared containing in solution from 2.7 to 15, preferably from 3 to 12, % by weight of a degraded starch having a viscosity $\eta_i$ from 0.04 to less than 0.12 dl/g. It is also possible to use as protective colloid a mixture of starches having different viscosities $\eta_i$, as long as the viscosity of the mixture is within the stated $\eta_i$ range from 0.04 to less than 0.12 dl/g, making it possible to use in this case even starches whose viscosities are outside the range. For every 100 parts by weight of such an aqueous starch solution, from 40 to 140 parts by weight of a monomer mixture of components (a) to (c) are subjected to copolymerization. The monomers can be emulsified in the aqueous solution of the degraded starch either in the form of a mixture or separate from one another. To stabilize the emulsion, a small amount of emulsifier can be added to the aqueous starch solution. However, it is also possible to first emulsify the monomers in the water by means of an emulsifier and then to add the resulting emulsion to the aqueous starch solution. Suitable emulsifiers for this purpose are products of anionic or cationic character. Emulsifiers of this type are for example sodium alkyl sulfonate, sodium lauryl sulfate, sodium dodecylbenzenesulfonate and dimethylalkylbenzylammonium chlorides. It is advisable to use anionic emulsifiers in the case of anionic starches and cationic emulsifiers in the case of cationic starches. The amount of emulsifier which may be present ranges from 0 to 0.3, preferably from 0.05 to 0.2, % by weight, based on the total amount of monomers (a) to (c) used. Preferably, however, the emulsion polymerization is carried out in the absence of an emulsifier, since, in general, the emulsifiers impair the sizing effect and frequently give rise to substantial foaming in the processing and application of the sizing agent. The molecular weight of the copolymer can be reduced if desired by adding molecular weight regulants (transfer agents) such as dodecylmercaptan, 2-mercaptobenzothiazole, bromotrichloromethane and the like.

The copolymerization of the monomers is carried out in an aqueous solution of the degraded starch at from 40° to 110° C., preferably from 50° to 100° C., in the presence of a peroxide initiator. Suitable polymerization initiators are first and foremost hydrogen peroxide, combinations of hydrogen peroxide with a heavy metal salt, eg. iron(II) sulfate, or a redox system of hydrogen peroxide with a suitable reducing agent, such as sodium formaldehydesulfoxylate, ascorbic acid, sodium disulfite and/or sodium dithionite. Preference is given to using a redox system of hydrogen peroxide, a reducing agent or a mixture of the reducing agents mentioned, and additionally a small amount of heavy metal salt, eg. iron(II) sulfate. Further suitable peroxide initiators are for example organic peroxides, hydroperoxides and peroxodisulfates. Suitable compounds of this type are for example tert.-butyl hydroperoxide, acetylcyclohexylsulfonyl peroxide, sodium peroxodisulfate, potassium peroxodisulfate and ammonium peroxodisulfate.

During the polymerization it is necessary to ensure thorough mixing of the components. Thus the reaction mixture is preferably stirred throughout the entire period of polymerization and any subsequent postpolymerization period employed for reducing the residual monomer content. The polymerization is carried out in the absence of oxygen in an inert gas atmosphere, for example under nitrogen. To start the polymerization, first the oxygen is removed from the aqueous solution of the starch and from the monomers, and initially from 1 to 40% of the monomers to be polymerized are added to the aqueous solution of the starch and emulsified therein by stirring. An aqueous initiator solution is added beforehand, at the same time or subsequently and the polymerization starts, generally after a short induction period. The heat of polymerization produced at the start of the polymerization can be used to heat the reaction mixture, and the temperature can rise as high as 90° C. As soon as the monomers introduced initially have polymerized, the remainder of the monomers and of the initiator solution is added continuously or a little at a time and stirred in to take part in the polymerization. However, the metering in of the monomers can also be performed continuously from the start of the copolymerization. The result obtained is a finely divided, aqueous dispersion where the copolymer particles are surrounded by a coat of protective colloid based on degraded starch. A measure for the fineness of the dispersion is the LT (Light transmittance) value of the dispersion. The LT value is obtained by measuring the light transmittance of the dispersion in a 0.01 % strength by weight aqueous solution in a cell of pathlength 2.5 cm at 546 nm against water as reference standard, the transmittance of water being set at 100%. The finer the dispersion, the higher the LT value obtained by this method.

The average size of the copolymer particles with out the protective colloid coating of degraded starch can be determined by enzymatically degrading the starch coating around the latex particles virtually completely. Any possible coagulation of the copolymer dispersion in the course of this enzymatic degradation can be prevented by adding a suitable emulsifier. After enzymatic degradation, the particle size of the copolymer dispersion can be measured using instruments customary in the art, for example the Nanosizer from Coulter Electronics. The average diameter of the copolymer particles without the coating of protective colloid lies within the range from 75 to 200 nm.

The above-mentioned finely divided aqueous dispersion of a copolymer is used as a pulp- or surface sizing agent for paper. The solids content of the abovedescribed aqueous copolymer dispersion ranges from 35 to 63, preferably from 38 to 60, % by weight. In the surface sizing of paper, the copolymer dispersion is standardized by addition of water to a total polymer concentration generally customary for sizing solutions for paper, eg. to a polymer content from 0.05 to 3.0% by weight. The amount of copolymer applied to the paper for sizing purposes ranges in general from 0.02 to 1.5, preferably from 0.3 to 0.8, % by weight, based on dry fiber. To prepare the sizing solution, the dispersion, having a solids content from 35 to 63% by weight, is diluted with water. The sizing solution can also contain further assistants, for example natural starch for increasing the strength of the paper, wet- and dry- strengtheners based on synthetic products, dyes and wax emulsions.

The sizing solution is generally applied to the surface of the paper by means of a size press. It is of course also possible to apply the sizing solution to the paper web by spraying or dipping or for example by means of a water doctor. The paper treated with the sizing solution is then dried at elevated temperatures. Drying the paper web is sufficient to bring the size to full development. If the finely divided dispersion is used as a pulp-sizing agent the dispersion is added to the paper stock. The amount of dispersion required for adequate pulp sizing is the same in terms of polymer as required for surface sizing. Suitable for pulp sizing are in particular cationically modified finely divided dispersions.

In the Examples, the parts and pecentages are by weight. The degree of sizing of the papers was determined in terms of the Cobb value defined in German Standard Specification DIN No. 53,132. To test the sizing action of the copolymer dispersion, two different test papers were used. They had the following stuff compositions:

Test paper A
50% of bleached sulfate pulp
50% of bleached sulfate pulp
30% of chalk, based on dry pulp.
Produced at pH 7.

Test paper B
50% of bleached sulfite pulp
50% of bleached sulfate pulp
25% of china clay, based on dry pulp
2% of alum, based on dry paper.

The two test papers, which had not been sized in the stock, had a basis weight of 70 g/m$^2$. The freeness was 25°SR (Schopper-Riegler), and the ash content 14%. The sizing solutions each contained, unless otherwise stated, 2.5 g/l of the copolymer, based on the solids content of the dispersion, and 60 g/l of an oxidatively degraded starch having an $\eta_i$ of 0.36 dl/g. The liquor uptake was in all cases 90%, based on dry paper.

The average particle size in the copolymer dispersion was measured after virtually complete enzymatic degradation of the protective colloid coating by means of a Nanosizer from Coulter Electronics. First 10 ml of the dispersion were diluted with 30 ml of water. To 1 ml of the aqueous solution thus obtained were then added 0.03 g of citric acid and 0.2 g of the sodium salt of the hydrogensulfate of the reaction product of 1 mol of isooctylphenol with 25 mol of ethylene oxide. The pH was brought to 5.0 by addition of dilute ammonia solution, 3 ml of a 1% strength aqeuous commerical enzyme solution ($\alpha$-amylase B) were added, and the mixture was heated at 55° C. for 1 hour. The sample was subsequently diluted with water to a concentration of ~0.001% by weight. Thereafter the particle diameter was determined in a Nanosizer.

| | Characterization of starches and enzymes used | | |
| --- | --- | --- | --- |
| | $\eta_i$ dl/g | Degree of substitution mol/ mol glucose units | Solids content % |
| Starch I: | | | |
| oxidatively degraded potato starch | 0.28 | 0.034 —COOH | 82 |
| Starch II: | | | |
| degraded, cationic potato starch | 0.47 | 0.015 —COOH 0.027 N | 83 |
| Starch III: | | | |
| degraded, cationic potato starch | 1.16 | 0.07 N | 83 |
| Starch IV: | | | |
| mixture of 80% Starch II + 20% Starch III | 0.68 | 0.036 N | 83 |

$\alpha$-amylase A $\alpha$-Amylase A is an $\alpha$-amylase of higher thermal stability. 16.7 mg of 100% strength $\alpha$-amylase A degrades 5.26 g of "Amylum Solubile" starch from Merck at 37° C. and pH 5.6 and in the presence of a calcium content in a solution of 0.0043 mol/l in from 7 to 20 minutes. α-Amylase A is most active at 90° C. and pH 6.5.

α-Amylase B

α-Amylase B is most active at 55° C. and pH 5.0. 1.25 mg of 100% strength α-amylase B degrades 5.26 g of "Amylum Solubile" starch from Merck at 37° C. and pH 4.7 in from 7 to 20 minutes.

EXAMPLE 1

In a 1-l four-necked flask which is equipped with a stirrer, a reflux condenser, means for metered addition and means for working under nitrogen, 36.5 g of Starch I are suspended in 146 g of water and heated with stirring to 85° C. After 30 minutes at 85° C. 2.3 g of an aqueous 10% strength calcium acetate solution and 15.4 g of a 1% strength enzyme solution (α-amylase A) are added. After a further 20 minutes at 85° C. the enzymatic starch degradation is stopped by adding 7.5 g of glacial acetic acid. After the treatment the intrinsic viscosity of the starch is 0.058 dl/g. 5.0 g of a 1% strength aqueous iron(II) sulfate solution and 1.33 g of 30% strength hydrogen peroxide are added. At 85° C. an emulsion consisting of 68.75 g of acrylonitrile, 56.25 g of n-butyl acrylate and a solution of 1.85 g of sodium formaldehydesulfoxylate and 0.2 g of a sodium $C_{14}$-alkylsulfonate in 50 g of water is added in the course of 1.5 hours and, separately, 50 g of a 2.35% strength hydrogen peroxide solution are added in the course of 1.75 hours. After the monomers have been metered in, the reaction mixture is maintained at 85° C. with stirring for a further 60 minutes. The result obtained is a dispersion having a solids content of 42.4% and an LT value of 84 (particle size without starch coating 145 nm).

EXAMPLE 2

In a 1-L four-necked flask equipped with a stirrer, a reflux condenser, a metering device and means for working under nitrogen, 35.5 g of starch I are suspended in 150 g of water and heated with stirring to 85° C. After 30 minutes at 85° C. 2.3 g of an aqueous 10% strength calcium acetate solution and 15.4 of a 1% strength enzyme solution (α-amylase A) are added. After a further 20 minutes at 85° C. the enzymatic starch degradation is stopped by adding 7.5 g of glacial acetic acid. After the treatment the intrinsic viscosity of the starch is 0.06 dl/g. 12 g of a 1% strength aqueous iron(II) sulfate solution and 2.38 g of 30% strength hydrogen peroxide are added. At 85° C. a monomer mixture of 123.75 g of acrylonitrile and 101.25 g of n-butyl acrylate is added in the course of 1.5 hours, and separately therefrom a solution of 0.22 g of a sodium $C_{14}$alkylsulfonate emulsifier and 2.04 of hydrogen peroxide in 47.7 g of water is added in the course of 1.75 hours. After the monomers have been metered in, the reaction mixture is maintained at 85° C. with stirring for a further 60 minutes. The result obtained is a dispersion having a solids content of 51.1% and an LT value of 77 (particle size without starch coating 150 nm).

EXAMPLE 3

In a 1-l four-necked flask equipped with a stirrer, a reflux condenser, a metering device and means for working under nitrogen, 42.5 g of starch II are suspended in 142 g of water and heated with stirring to 85° C. After 30 minutes at 85° C. 2.6 of an aqueous 10% strength calcium acetate solution and 13.5 g of a 1% strength enzyme solution (α-amylase A) are added. After a further 20 minutes at 85° C. the enzymatic starch degradation is stopped by adding 7.5 g of glacial acetic acid. Thereafter 9 g of 1% strength iron(II) sulfate solution and 1.75 g of 30% strength hydrogen peroxide are added. After 15 minutes the hydrogen peroxide has decomposed and the oxidative degradation of starch has ended. The intrinsic viscosity of the starch mixture is then 0.045 dl/g. 1.8 g of 30% strength hydrogen peroxide are then added and immediately a start is made on the simultaneous but separate additions of an emulsion comprising 93.7 g of acrylonitrile, 76.4 g of n-butyl acrylate and a solution of 2.5 g of sodium formaldehydesulfoxylate and 0.2 g of sodium $C_{14\text{-}alkyl\,sulfonate\,in}$ 60 g of water on the one hand and 50 g of a 3.12% strength hydrogen peroxide solution on the other at a uniform rate in the course of 1.5 and 1.75 hours respectively. During this time and for a further 60 minutes after the end of the addition of the hydrogen peroxide solution the temperature of the reaction mixture is maintained at 85° C. The result obtained is a dispersion having a solids content of 42.2% and an LT value of 80 (particle diameter without starch coating 144 nm).

EXAMPLE 4

In a 1-L four-necked flask equipped with a stirrer, a reflux condenser, a metering device and means for working under nitrogen, 42.4 g of starch IV are suspended in 142 g of water and heated with stirring to 85° C. After 30 minutes at 85° C. 2.6 g of an aqueous 10% strength calcium acetate solution and 17.9 g of a 1% strength enzyme solution (α-amylase A) are added. After a further 20 minutes at 85° C. the enzymatic starch degradation is stopped by adding 7.5 g of glacial acetic acid. Thereafter 9 g of a 1% strength iron(II) sulfate solution and 1.75 g of 30% strength hydrogen peroxide are added. After 15 minutes the hydrogen peroxide has decomposed and the oxidative degradation of starch has ended. The intrinsic viscosity of the starch mixture is then 0.052 dl/g. 1.8 g of 30% strength hydrogen peroxide are then added, and immediately a start is made on the simultaneous but separate addition of an emulsion comprising 93.7 g of acrylonitrile, 76.4 g of n-butyl acrylate and a solution of 2.5 g of sodium formaldehydesulfoxylate and 0.2 g of sodium $C_{14}$-alkylsulfonate in 60 g of water on the one hand and 50g of a 3.12% strength hydrogen peroxide solution on the other at a uniform rate in the course of 1.5 and 1.75 hours respectively. During this time and for 60 minutes after the end of the addition of monomer, the temperature of the reaction mixture is maintained at 85° C. The result obtained is a dispersion having a solids content of 41.5% and an LT value of 81 (particle diameter without starch coating 138 nm).

EXAMPLE 5

In a 1-l four-necked flask equipped with a stirrer, a reflux condenser, means for metered addition and means for working under nitrogen, 34.0 g of starch II and 8.4 g of starch III are suspended in 148 g of water and heated with stirring to 85° C. After 30 minutes at 85° C. 2.6 g of an aqueous 10% strength calcium acetate solution and 10 g of a 1% strength enzyme solution (α-amylase A) are added. After a further 20 minutes at 85° C. then enzymatic starch degradation is stopped by adding 7.5 g of glacial acetic acid. Thereafter 16.5 g of a 1% strength iron(II) sulfate solution and 1.75 g of 30% strength hydrogen peroxide are added. After 20 minutes the hydrogen peroxide has decomposed and the oxidative degradation of starch has ended. The intrinsic viscosity of the starch mixture is then 0.08 dl/g. 1.8 g of 30% strength hydrogen peroxide are then added, and an immediate start is made on the simultaneous but separate additions at a uniform rate of an emulsion comprising 93.7 g of acrylonitrile, 76.4 g of n-butyl acrylate and a solution of 0.2 g of sodium $C_{14}$-alkylsulfonate in 50 g of water on the one hand and 50 g of a 3.12% strength hydrogen peroxide solution on the other in the course of 1 hour and 1.75 hours respectively. During this time and for 60 minutes after the end of the addition of monomer, the temperature of the reaction mixture is maintained at 85° C. The result obtained is a dispersion having a solids content of 41.0% and an LT value of 80 (particle diameter without starch coating 143 nm).

EXAMPLE 6

In a 1-l four-necked flask equipped with a stirrer, a reflux condenser, means for metered addition and means for working under nitrogn, 34.0 g of starch II and 8.4 g of starch III are suspended in 135 g of water and heated with stirring to 85° C. After 30 minutes at 85° C. 2.6 g of an aqueous 10% strength calcium acetate solution and 17.9 g of a 1% strength enzyme solution ($\alpha$-amylase A) are added. After a further 20 minutes at 85° C. the enzymatic starch degradation is stopped by adding 7.5 g of glacial acetic acid. Thereafter 16.5 g of a 1% strength iron(II) sulfate solution and 1.75 g of 30% strength hydrogen peroxide are added. After 20 minutes the hydrogen peroxide has decomposed and the oxidative degradation of starch has ended. The intrinsic viscosity of the starch mxiture is then 0.07 dl/g. 1.8 g of 30% strength hydrogen peroxide are then added, and an immediate start is made on the simultaneous but separate additions at a uniform rate of an emulsion comprising 76.6 g of acrylonitrile, 68 g of n-butyl acrylate, 25.5 g of t-butyl acrylate and a solution of 2.5 g of sodium formaldehydesulfoxylate and 0.2 g of sodium $C_{14}$-alkylsulfonate in 60 g of water on the one hand and 50 g of a 3.12% strength hydrogen peroxide solution on the other in the course of 1.5 hours and 1.75 hours respectively. During this time and for 60 minutes after the end of the addition of monomer, the internal temperature of the flask is maintained at 85° C. The result obtained is a dispersion having a solids content of 39.5% and an LT value of 85 (particle diameter without starch coating 132 nm).

TABLE 1

Surface sizing with sizing agents prepared in Examples 1 and 2 on test papers A and B

| Example | Test Paper A Cobb value | Test paper B Cobb value |
| --- | --- | --- |
| 1 | 21 | 20 |
| 2 | 24 | 19 |

Dispersions prepared with cationic starch are preferably usable as pulp-sizing agents for paper. The sizing agent is added before the sheet is formed. Two different types of paper were tested. The starting stuffs for producing papers C and D have the following compositions:
Paper C: 100% of sulfite pulp, 30% of $CaCO_3$, 0.3%, based on dry paper, of a copolymer of acrylamide and acrylic acid; 12% of ash (as $CaCO_3$).
Paper D: 100% of bleached fine sulfite pulp, 35°SR 30% of china clay X 1 0.25% of polyethyleneimine 2 % of alum pH 5.0

TABLE 2

Use of dispersions from Examples 3 to 6 as pulp-sizing agents for paper

| Example | Concentration % | Paper C Cobb value | Paper D Cobb value |
| --- | --- | --- | --- |
| 3 | 0.75 | 43 | 47 |
|   | 1.5 | 31 | 25 |
| 4 | 0.75 | 33 | 46 |
|   | 1.5 | 26 | 25 |
| 5 | 0.7 | 41 | 49 |
|   | 1.5 | 22 | 25 |
| 6 | 0.75 | 30 | 40 |
|   | 1.5 | 20 | 25 |

COMPARATIVE EXAMPLE 1

Example 3 of U.S. Pat. No. 3,061,471 was repeated to digest 45.7 g of starch I in 422 g of water 85° C. After 0.16 g of calcium acetate had been added, 2.3 g of a 1% strength enzyme solution ($\alpha$-amylase A) were added. After 30 minutes $\eta_i$ was 0.28 dl/g. Thereafter 1 g of glacial acetic acid and 0.05 g of iron(II) ammonium sulfate solution were added, and the temperature of the reaction mixture was reduced to 50° C. 45.2 g of ethyl acrylate, 0.2 g of ascorbic acid and 0.67 g of 30% strength hydrogen peroxide was then added. The temperature of the reaction mixture rose rapidly to 75° C. and was maintained at that value for 1.1hours. The resulting dispersion had a solids content of 16.6% and an LT value of 99.

The dispersion thus prepared was diluted to a solids content of 2.5 g/l and then used in this form for sizing the above-described test papers A and B. Test paper A had a Cobb value of 81, while test paper B had a Cobb value of 86.

COMPARATIVE EXAMPLE 2

In accordance with Example 7 of U.S. Pat. No. 3.061,472, 67.5 g of starch II were digested in 270 ml of water, and the aqueous solution was diluted with 487 g of water and brought to 50° C. ($\eta_i=0.28$ dl/g). 1 ml of glacial acetic acid, 0.3 g of iron(II) ammonium sulfate, 6.6 g of a commercial emulsifier (alkylphenoxy ether of polyoxyethylene with on average 10 oxyethylene groups), 67.5 g of tert.-butyl acrylate and 1.5 of 30% strength hydrogen peroxide were added. Polymerization was carried out at 60° C. After 2 hours the reaction mixture was cooled down. The result obtained was a dispersion having a solids content of 15.1% and an LT value of 85%. The diameter of the polymer particles was 177 nm. The above-described test papers A and B were each sized with a dispersion containing 2.5 g/l of solids. The Cobb value for test paper A and 76 and for test paper B 89.

COMPARATIVE EXAMPLE 3

In accordance with Example 3 of U.S. Pat. No. 4,301,017, 182 g of an 82% strength starch IV were suspended in 260 g of water in a polymerization vessel and digested by heating to 85° C. The starch solution was then degraded with 0.1 g of a commercial enzyme ($\alpha$-amylase Termamyl 60 L) down to an $\eta_i$ value of 0.24 dl/g. 5 g of glacial acetic acid was then added, followed by 5 g of 30% strength hydrogen peroxide. 20 g of a monomer mixture of 54 g styrene and 6 g of acrylonitrile were added; the remainder was not added until the polymerization had started up. The polymerization was carried out at 90° C. and was complete after 2.5 hours.

The dispersion had a solids content of 41.6% and an LT value of 57.

The dispersion was diluted to a solids content of 2.5 g/l and used for sizing test papers A and B. With both the papers, the Cobb value after sizing was more than 150.

COMPARATIVE EXAMPLE 4

In accordance wtih Example 6 of EP Application No. 134,449, 8 g of dextrin were dissolved in 55 g of water at 70° C. The solution was brought to pH 2.8 by addition of glacial acetic acid, and 1.1 g of 80% strength tert.-butyl hydroperoxide were added. A mixture of 40 g of styrene and 60 g of n-butyl acrylate and a solution of 0.6 g of sodium formaldehydesulfoxylate and 0.6 g of sodium sulfite in 50 g of water were then metered in simultaneously in the course of 2 hours. On completion of the addition the reaction mixture was postpolymerized at 70° C. for 1 hour. The result obtained was a dispersion having a solids content of 51.6% and an LT value of 56%. The average particle diameter in the dispersion was 179 nm.

The polymer dispersion thus obtained was diluted to a solids content of 2.5 g/l and used for sizing test papers A and B. After sizing, test paper A was found to have a Cobb value of 80 and test paper B a Cobb value of 85.

COMPARATIVE EXAMPLE 5

In accordance with Example 1 of Japanese Preliminary Published Application No. 58/115,196, 18.5 g of starch II are suspended in 400 ml of water in a 2-l flask equipped with a stirrer and reflux condenser, and the suspension was heated at 90° C. for 40 minutes. After the digested starch had been cooled down to 30° C., a mixture of 58 g of styrene and 43.5 g of n-butyl acrylate and, as initiator, a solution of 1 g of potassium peroxodisulfate in 50 ml of water was added. The reaction mixture was heated to 80° C. with stirring and maintained at that temperature for 3 hours. The reaction mixture was then polymerized to completion at 90° C. in the course of a further 3 hours and then cooled down. The result obtained was a dispersion having a solids content of 20.6% and an LT value of 84. The diameter of the polymer particles was 101 nm.

The dispersion thus obtained was diluted to a solids content of 2.5 g/l and used as a sizing agent for the above-described test papers A and B. The Cobb value of sized test paper A was 58 and of sized test paper B 29.

COMPARATIVE EXAMPLE 6

Comparative Example 5 was repeated to suspend 18.5 g of starch II in 400 ml of water and digest the starch suspension at 90° C. After cooling down to 85° C., 0.5 g of 10% strength calcium acetate solution and 1 g of a 1% strength α-amylase A were added. After 20 minutes of enzymatic degradation at 85° C. the enzyme was deactivated by adding 4 ml of glacial acetic acid. The starch then had an $\eta_i$ value of 0.21 dl/g. After cooling down to 30° C., a mixture of 46 g of acrylonitrile, 40.5 g of n-butyl acrylate and 15 g of tert.-butyl acrylate was added together with an initiator solution of 1 g of potassium peroxodisulfate in 50 ml of water. The mixture was stirred, heated to 80° C. and maintained at that temperature for 3 hours. This was followed by a postpolymerization period of 3 hours at 90° C. The mixture was then cooled down. The result obtained was a dispersion having a solids content of 20.4% and an LT value of 44. The particle diameter in the dispersion was 278 nm.

The polymer dispersion thus obtained was diluted to a solids content of 2.5 g/l and used for sizing the above-described last papers A and B. After sizing, test paper A had a Cobb value of 95 and test paper B a Cobb value of 90.

We claim:

1. A sizing agent for paper based on a finely divided, aqueous dispersion of a copolymer, obtained by copolymerizing from 40 to 140 parts by weight of a monomer mixture of
   (a) from 20 to 65% by weight of acrylonitrile, methacrylonitrile, or a mixture thereof,
   (b) from 80 to 35% by weight of an acrylate of a monohydric saturated $C_3$–$C_8$-alcohol and
   (c) from 0 to 10% by weight of other ethylenically unsaturated copolymerizable monomers,
   the weight percentages (a), (b) and (c) always adding up to 100,
   in 100 parts by weight of an aqueous solution containing in solution from 2.7 to 15% by weight of a degraded starch having a viscosity $\eta_i$ from 0.04 to less than 0.12 dl/g at from 40° to 100° C. in the presence of a peroxide initiator.

2. A sizing agent as claim in claim 1, wherein a monomer mixture of
   (a) acrylonitrile and
   (b) one or more of n-butyl, isobutyl and tert butyl acrylates are copolymerized.

3. A sizing agent as claimed in claim 1, wherein the solids content of the ready-prepared dispersion ranges from 38 to 60% by weight.

4. A sizing agent as claimed in claim 1, wherein the starch used comprises a modified starch which, before the polymerization, is first brought to a viscosity $\eta_i$ within the range from 0.045 to 0.11 dl/g by enzymatic and then by oxidative molecular weight degradation.

5. A sizing agent as claimed in claim 1, wherein the monomer mixture copolymerize contains as monomer (c) at least one of a di-$C_1$–$C_3$alkylamino-$C_2$–$C_6$alkyl (meth)acrylate, N-vinylimidazoline, N-vinyl-2-methylimidazoline or a quaternization product thereof.

6. A sizing agent as claimed in claim 1, wherein the monomer mixture copolymerized contains as monomer (c) at least one of styrene, acrylamide, methacrylamide, methacrylates and acrylates different from acrylates (b).

7. A process for sizing paper which comprises sizing said paper with a copolymer obtained by copolymerizing from 40 to 140 parts by weight of a monomer mixture of
   (a) from 20 to 65% by weight of arylonitrile, methacrylonitrile, or a mixture thereof,
   (b) from 80 to 35% by weight of an acrylate of a monohydric saturated $C_3$–$C_8$-alcohol and
   (c) from0 to 10% by weight of other ethylenically unsaturated copolymerizable monomers,
   the weight percentages (a), (b) and (c) always adding up to 100,
   in 100 parts by weight of an aqueous solution containing in solution from 2.7 to 15% by weight of a degraded starch having a viscosity $\eta_i$ from 0.04 to less than 0.12 dl/g at from 40° to 100° C. in the presence of a peroxide initiator.

* * * * *